(12) United States Patent
Levi et al.

(10) Patent No.: US 10,698,751 B2
(45) Date of Patent: Jun. 30, 2020

(54) WEB SERVICES GENERATION BASED ON CLIENT-SIDE CODE

(71) Applicant: ENTIT SOFTWARE LLC, Sanford, NC (US)

(72) Inventors: Elad Levi, Rehovot (IL); Avigad Mizrahi, Jerusalem (IL); Ran Bar Zik, Petah Tiqwa (IL)

(73) Assignee: Micro Focus LLC, Santa Clara, CA (US)

( * ) Notice: Subject to any disclaimer, the term of this patent is extended or adjusted under 35 U.S.C. 154(b) by 205 days.

(21) Appl. No.: 15/524,411

(22) PCT Filed: Nov. 4, 2014

(86) PCT No.: PCT/US2014/063837
§ 371 (c)(1),
(2) Date: May 4, 2017

(87) PCT Pub. No.: WO2016/072973
PCT Pub. Date: May 12, 2016

(65) Prior Publication Data
US 2018/0285175 A1 Oct. 4, 2018

(51) Int. Cl.
*G06F 9/44* (2018.01)
*G06F 9/54* (2006.01)
*G06F 8/30* (2018.01)

(52) U.S. Cl.
CPC .............. *G06F 9/547* (2013.01); *G06F 8/30* (2013.01); *G06F 2209/544* (2013.01)

(58) Field of Classification Search
CPC ...................................................... G06F 9/547

USPC ......................................................... 717/106
See application file for complete search history.

(56) References Cited

U.S. PATENT DOCUMENTS

| 8,312,480 | B2 | 11/2012 | O'Connell, Jr. | |
| 8,752,183 | B1 | 6/2014 | Heiderich et al. | |
| 2006/0200664 | A1* | 9/2006 | Whitehead | G06F 21/6209 713/165 |
| 2007/0255720 | A1* | 11/2007 | Baikov | G06Q 10/06 |
| 2008/0098028 | A1 | 4/2008 | Shan et al. | |
| 2009/0119158 | A1 | 5/2009 | Chen et al. | |
| 2010/0312829 | A1* | 12/2010 | O'Connell, Jr. | G06F 17/30861 709/203 |
| 2014/0173415 | A1* | 6/2014 | Kattil Cherian | G06F 17/30861 715/234 |
| 2014/0289699 | A1* | 9/2014 | Paterson | G06F 11/3664 717/106 |

(Continued)

OTHER PUBLICATIONS

Bryne, J. C. et al, "Web Services Development Guide: How to Build Embrace Compliant Web Services Version 0.3," (Research Paper), Sep. 8, 2014, 14 pages.

(Continued)

*Primary Examiner* — Qamrun Nahar (57) ABSTRACT

In one example in accordance with the present disclosure, a system for web services generation based on client-side code scans client-side code of a web technology to find included server call code, where the server call code includes a request to a web service. The system analyzes the server call code to determine a type of the request to the web service. The system generates web service code capable of handling requests of the type of the request to the web service.

20 Claims, 5 Drawing Sheets

(56) References Cited

U.S. PATENT DOCUMENTS

2014/0359001 A1* 12/2014 Dupoteau ............... H04L 67/02
    709/203
2016/0006635 A1* 1/2016 Yokota ................ H04L 43/0888
    709/226

OTHER PUBLICATIONS

International Search Report & Written Opinion received in PCT Application No. PCT/US2014/063837, dated Jun. 24, 2015, 7 pages.

McCarthy, V., "Web Services Tool for End-to-end Code Generation," (Web Page), Sep. 8, 2014, 4 pages, available at www.idevnews.com/stories/3605/Web-Services-Tool-for-End-to-End.

Unknown, "Turn Your Design Into a Functional Website," (Web Page), Accessed Sep. 8, 2014, 5 pages, available at https://www.backlift.comhttps://www.backlift.com.

* cited by examiner

WEB SERVICES GENERATION BASED ON CLIENT-SIDE CODE

BACKGROUND

Various web technologies exist that allow users to access and interact with various aspects of the web technology by executing client-side code using software programs, operating systems or the like running on the users' devices. Examples of such web technologies include interactive webpages and mobile applications. When a user's device executes client-side code for the web technology, this may cause the web technology to communicate with a remote server. The remote server may store, as a component of the web technology, additional server-side code (e.g., web services). This server-side code may execute or run on the remote server and may perform certain routines when it receives requests or instructions from the user's device. The remote server may, in some situations, send return data to the user's device in response to the request.

BRIEF DESCRIPTION OF THE DRAWINGS

The following detailed description references the drawings, wherein.

DETAILED DESCRIPTION

When developers create a web technology or a feature of a web technology, both client-side code and server-side code (e.g., web services) may need to be created. In some situations, different developers or groups of developers are responsible for the client-side code and the server-side code. Often, the server-side developers may need to understand all the details and requirements of the client-side code and then may need to create all the server-side code (e.g., web services, DTO's, etc.) to interface properly with the client-side code. This procedure is time consuming and error prone. This issue may be exacerbated by the fact that web technologies often have various changes and fixes that are implemented, and each change or fix may include changes to the client-side code and the corresponding server-side code. It may be beneficial if the server-side developers could work on the server-side code without needing to understand all the details of the client-side code first. This would allow server-side developers to work in parallel with client-side developers, saving time and money. Additionally, it may be beneficial if a portion of the server-side code was automatically generated, thus aiding the server-side developer in writing code that interfaces properly with the client-side code, resulting in fewer errors and time savings.

In some situations, some server-side code (e.g., "server stub code") may be generated based on a WSDL (web service description language) file. A WSDL file defines an interface between the client-side code and the server-side code. However, in such situations, if the WSDL file does not exist, no server-side code can be generated. In other situations, if the server-side code (e.g., web service) already exists, a WSDL file and perhaps other code necessary to use the web service may be generated, but in this situation, the server-side code must already exist. Thus, if a WSDL file is not available and if the server-side code does not exist, in these situations, there is no way to generate a portion of the server-side code.

The present disclosure describes web services generation based on client-side code. According to the present disclosure, a system may scan client-side code of a web technology to find included server call code, where the server call code includes a request to a web service. The system may then analyze the server call code to determine a type of the request to the web service and may automatically generate web service code capable of handling requests of the type of the request to the web service. Thus, the system may automatically generate a portion of server-side code based on the client-side code even when a WSDL file or other interface definition file does not exist. The system may also generate web service parameters for the web service code. These parameters, in some examples, may be passed to the web service code via at least one DTO or other data object. The system may also automatically generate the at least one DTO or data object. The automatic generation of the server-side code may make it easier for a server-side developer to create additional server-side code that easily interfaces with the client-side code, allowing the server-side developer to focus more on the logic and functionality of the server-side code.

Figure 1:
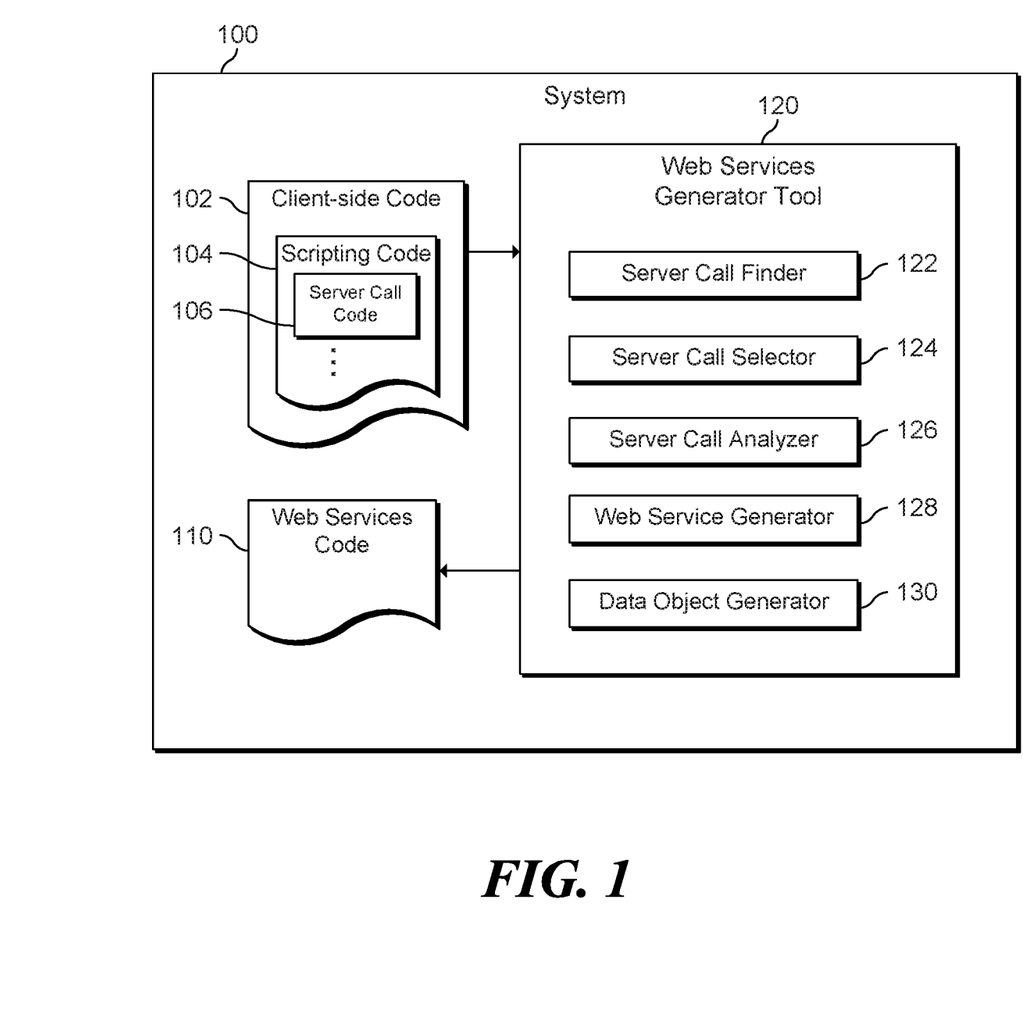
FIG. 1 is a block diagram of an example system in which web services generation based on client-side code may be useful.

FIG. 1 is a block diagram of an example system 100 in which web services generation based on client-side code may be useful. System 100 may include client-side code 102 and web services generator tool 120. Web services generator tool 120 may access client-side code 102, perform various routines, and output web services code 110. A developer or team of developers may have created client-side code 102. A different developer or group of developers may be responsible for creating server-side code that works with client-side code 102, and in some situations, web services code 110 may aid such a different developer or group of developers. Web services code 110, for example, may include at least one web service. A web service is a function or routine (e.g., a software function) that is provided at a network address (e.g., via the internet). In some examples, the web service is "always on," meaning that client-side code can communicate with the web service whenever it determines it appropriate. Web services code 110 may also include at least one DTO (Data Transfer Object). A DTO is a data object that carries data between processes. A DTO may aggregate multiple pieces of data that may otherwise have been transferred by multiple server calls, and thus a DTO may reduce the number of server calls required. Web services code may include other data objects besides or in addition to DTOs, but DTOs may be used in various descriptions herein as examples.

Client-side code 102 may be part or all of the client-side code for a web technology. The client-side code, as its name suggests, may be accessible (e.g., over a network) by at least one client once the web technology is deployed. Client-side code 102 may include a number of client-side code files. Client-side code 102 may include, for example, at least one base web code file, e.g., written in a web based programming language such as HTML (HyperText Markup Language).

Client-side code 102 may also include at least one style and formatting code file, e.g., written in a formatting language such as CSS (Cascading Style Sheets). Client-side code 102 may also include at least one scripting code file, collectively referred to as scripting code 104. These scripting code files may be referenced by the base web code and may provide additional or dynamic logic to the web technology when the client-side code is executed. These scripting code files may be written in a scripting language such as JavaScript (JS). JavaScript is a dynamic computer programming language that is commonly used for webpages that use client-side scripts to interact with users. JavaScript may, in effect, determine the behavior of the webpage, for example, opening and closing menus and items, animations, requesting information from a remote servers, etc.

In some examples, the client-side code 102 may not be actually divided into the precise separate files or groups of files described above, and, instead, some or all of this code may be located in at least one common file. Still, there may be portions of code that are essentially base web code, style & formatting code and scripting code. In some examples where the web technology is a native mobile app, the client-side code 102 may be written in a language executable by a mobile operating system.

As described above, client-side code 102 may include scripting code 104, and within scripting code 104, there may be portions of code that make calls to remote servers. One example of a portion of code that makes such a server call is represented in FIG. 1 by server call code 106. Scripting code 104 may include more than one portion of server call code, but for ease of description and understanding, the present disclosure will discuss one example portion of server call code (server call code 106).

Server call code 106 may include code that is written to communicate with a remove server. Server call code 106 may include code, for example, for requesting data from the remote server. In these examples, server call code 106 may also include code for handling response data from the remote server, e.g., code for parsing and handling the response data such that the client-side code can make sense of the return data and use or present that data in a useful manner. In some examples, server call code 106 may include code for sending data to the remote server, e.g., for storage on the remote server.

Table 1 below shows a specific example of server call code that may be, for example, server call code 106. It can be seen by looking at Table 1 that the server call code includes an http (a protocol used for client-server communications) "post" request to a remote server (located at network address "/app/service"). More specifically, this is a request to a web service on the remote server. The web service on the remote server may not yet exist at the server call code is created, but the server call code may be written as though the service does exist. Various descriptions below will explain other parts of the server call code of Table 1 that may be detected and analyzed by web services generation tool 120.

TABLE 1

Example server call code $http.post("/app/service/account/details", {"accountId": id, "accountName":
name, "activeUsers": counter})
.success(function (response) {
    var succeed = response. succeed;

TABLE 1-continued

Example server call code

```
    if (succeed){
        var totalActiveUsersForAllAccounts = response.totalUsers;
        if (totalActiveUsersForAllAccounts > 1000){
            console.log ("More than 1000 Users in all accounts")
        }
    }
})
```

Web services generator tool 120 may access client-side code 102 (including scripting code 104 and server call code 106), perform various routines, and output web services code 110, which may include at least one web service and may include at least one DTO or other data object, as described above. Web services generator tool 120 may include a server call finder 122, a server call selector 124, a server call analyzer 126, a web service generator 128 and a data object generator 130. Each of these components and web services generator tool 120 in general may each include instructions (e.g., stored on a machine-readable storage medium of system 100) that, when executed (e.g., by a processor of system 100), implement the functionality of web services generator tool 120. Alternatively or in addition, web services generator tool 120 may include electronic circuitry (i.e., hardware) that implements the functionality of web services generator tool 120.

Server call finder 122 may access client-side code 102 and may scan it to find scripting code 104. Server call finder 122 may then scan scripting code 104 to find at least one server call code portion (e.g., 106). As a specific example and continuing with the example of Table 1 above, server call finder 122 may find the server call code of Table 1 (which may also be 106 in this example). To find a particular server call code portion, server call finder 122 may use static code analysis. For example, server call finder 122 may look for various keywords, function calls or the like in scripting code 104 that may indicate a call to a remote server. For example, referring to Table 1 above, server call finder 122 may detect the "post" function. This post function and its related code may be considered one server call code portion (e.g., 106). In some examples, server call finder 122 may find multiple or all the server call code portions in scripting code 104.

Server call selector 124 may select at least one server call code portion from multiple server call code portions found by server call finder 122. As mentioned above, in some examples, server call finder 122 may find multiple or all the server call code portions in scripting code 104. Then, server call selector 124 may select at least one of those server call code portions to use to generate web services code 110. As one specific example, out of multiple available server call code portions, server call selector 124 may select the example server call code portion of Table 1 above. The selected server call code portion(s) may then be analyzed further by web services generation tool 120.

In some examples, server call selector 124 may include a graphical user interface (GUI). The GUI may, for example, display all the server call code portions found by server call finder 122. The GUI may allow a user (e.g., a developer) to select at least one of the found server call code portions that the web services generation tool 120 should use going forward to generate web services code 110. In some examples, the user may use the GUI to select all of the found server call code portions. As one specific example, out of multiple available server call code portions, the user may use the GUI to select the example server call code portion of Table 1 above.

Server call analyzer 126 may analyze the selected server call code portions (e.g., the server call code portion of Table 1). In some examples, server call analyzer 126 may also analyze code that is associated with the selected server call code portions. Server call analyzer 126 may extract various pieces of information from the server call code portion and may also analyzed associated code to determine or guess at other information. Even though some of the examples provided herein may describe analyzing just one server call code portion (e.g., the one of Table 1), it should be understood that multiple server call code portions may be analyzed, and thus multiple web services could be created in web services code 110, or a web service could be created or modified based on multiple analyzed server call code portions.

Server call analyzer 126 may detect the type of request in the server call code. As one specific example, and continuing with the example of Table 1 above, server call analyzer 126 may analyze the server call code of Table 1 and may detect that the request is a "post" request and is directed to the network address "/app/service/account/details." From this address, the "/app/service" portion may be interpreted as the service address, and the "/account/details" portion may be interpreted as a path within the service.

Server call analyzer 126 may also detect that the post request provides three parameters ("accountId," "accountName," and "activeUsers"). Server call analyzer 126 may determine the data types of these parameters by analyzing associated code to the server call code. For example, server call analyzer 126 may scan for code where these parameters are defined, initialized or used. An example of this code can be seen in Table 2 below. For this specific example, suppose that server call analyzer 126 detects that accountId is initialized with a number, accountName is initialized with a string, and activeUsers is used in an "IF" statement where depending on some condition, it is set to one number or another number (see Table 2 below for this example scenario). Based on this example scenario, server call analyzer 126 may determine that accountId is a number, accountName is a string, and activeUsers is a number.

TABLE 2

Example associated code

```
var id = 12345; //id is Integer
var name = "HP"; //name is String
var counter; //counter defined without type
if (some_condition)
    counter = 10; //counter is Integer
else
    counter = 0; //counter is Integer
```

Server call analyzer 126 may also analyze a response section of the server call code portion (e.g., the one of Table 1 above). By doing this, server call analyzer 126 may determine what data format the server call code portion expects to receive back from the remote server. For example, referring to the example server call code of Table 1, server call analyzer 126 may detect the "succeed" variable and the "totalUsers" variable. Server call analyzer 126 may determine the data types of these variables by analyzing the associated code in the server call code. For example, server call analyzer 126 may detect that the succeed variable is used in an "IF" statement condition, and thus it is a Boolean type. Likewise, server call analyzer 126 may detect that the totalUsers variable is ultimately (after being assigned to a new variable) compared to a number (1000), and thus it is a number type. Thus, it can be seen that server call analyzer 126 may use the context in which parameters or variable are used to determine the type of the parameter or variable.

Web service generator 128 may generate part of the web services code 110. In particular, web service generator 128 may generate at least one web service that corresponds to at least one server call code portion (e.g., 106) that was analyzed. Web service generator 128 may use information determined by server call analyzer 126, for example, information extracted from the analyzed server call code segment (and/or associated code) or information determined by contextual usage of parameters or variables.

Continuing on with the example of Table 1 above, web service generator 128 may generate example web service code after analyzing the example server call code of Table 1. Such example web service code is shown in Table 3 below. As can be seen in Table 3, a "Service" is generated with a path of "/account/details," as was determined by server call analyzer, and as was described above.

TABLE 3

Example web service code

```
@Service
@Path("/account/details ")
public class accountDetailsServices {
@POST
    public Response postDetails(AccountDetailsDTO accountDetails) { }
}
```

Next, because a "post" type request was detected in the example server call code of Table 1 (as was described above), code is generated for the example web service code of Table 3 that can handle a post type request. This can be seen in Table 3 above. It should be understood that other types of requests may be detected by server call analyzer 126 and, in such a case, web service generator 128 may generate code to handle the other type of request. The code that can handle a post type request includes a function that generates a response back to the requestor. This "response" function can be seen in Table 1 above, and it ultimately will accept the same parameters that are sent with the request (e.g., the "accountId," "accountName," and "activeUsers" parameters described above). In some examples, these parameters are passed to the response function using a DTO or other data object, as shown in Table 3 above. The creation of the DTO or data object will be described below. In the example of Table 3, the DTO that passes these parameters is called "accountDetails" and it is of the "AccountDetialsDTO" type, a type that is defined via a DTO class definition as is described in more detail below. Thus, it can be seen that the example web service code of Table 3 was generated by analyzing the example server call code of Table 1.

Data object generator 130 may generate part of the web services code 110. In particular, data object generator may generate at least one data object, such as a DTO that corresponds to at least one server call code portion (e.g., 106) that was analyzed. Data object generator 130 may use information determined by server call analyzer 126, for example, information extracted from the analyzed server call code segment (and/or associated code) or information determined by contextual usage of parameters or variables.

Continuing on with the example of Table 1 above, data object generator 130 may generate example data object code after analyzing the example server call code of Table 1. Such example data object code is shown in Table 4 below. As can be seen in Table 3, row 1, a first DTO class is defined called "AccountDetailsDTO." Data object generator 130 may create this data object to pass parameters to the "response" function shown in Table 1 above. It can be seen that the AccountDetailsDTO data object includes three parameters that correspond to the parameters detected in the server call code of Table 1. The parameters of the DTO may be referred to as "web service parameters" to distinguish them from the parameters detected in the server call code. It can be seen that the data types of these web service parameters are defined in this data object. These data types were determined by server call analyzer 126 as described above. In other words, server call analyzer 126 determined the structure of the DTO and data object generator 130 may generate the DTO code.

TABLE 4

| | Example data object code |
|---|---|
| 1 | public class AccountDetailsDTO{<br>    private int accountId;<br>    private String accountName;<br>    private int activeUsers;<br>} |
| 2 | public class AccountDetailsResponseDTO{<br>    private boolean succeed;<br>    private int totalUsers;<br>} |

In some examples, data object generator 130 may generate the web service parameters without the use of a DTO or other data object. In these examples, the web service parameters may be incorporate directly into the generated web service code (e.g., Table 3).

Table 4 also shows a second DTO (row 2). Data object generator may also generate this second DTO (called "AccountDetailsResponseDTO") to handle response data from the remote server. As described above, server call analyzer 126 may analyze a response section of the server call code portion of Table 1 above to determine what data the server call code portion expects to receive back from the remote server. As described above, the response section of Table 1 included a "succeed" variable of Boolean type (determined as described above) and a "totalUsers" variable of number type (determined as described above). Data object generator 130 may create this second data object to accept similar variables. To distinguish between the variables of Table 4, row 2 and the variables of Table 1, the variables in Table 4, row 2 may be referred to as response variables.

At this point, a substantial portion of the server-side code that is needed for the web technology to function has been generated. Once a server-side developer has access to this generated code, the developer can implement whatever server-side logic is needed, for example, using the parameter passed via the AccountDetailsDTO data object. This server-side logic may calculate various things, including data that is to be returned to the client-side code. For example, this server-side logic may set the "succeed" and "totalUsers" return variables that are to be returned to the client-side code. To return these variables to the client-side code, the server-side developer may create a new instance of the AccountDetailsResponseDTO data object and populate its data with the desired values. Then, this DTO may be returned as the response of the "postDetails" method shown in the example web service code of Table 3. This will cause these return variables to be returned, as the "server response," to the server call code of Table 1.

Figure 2:
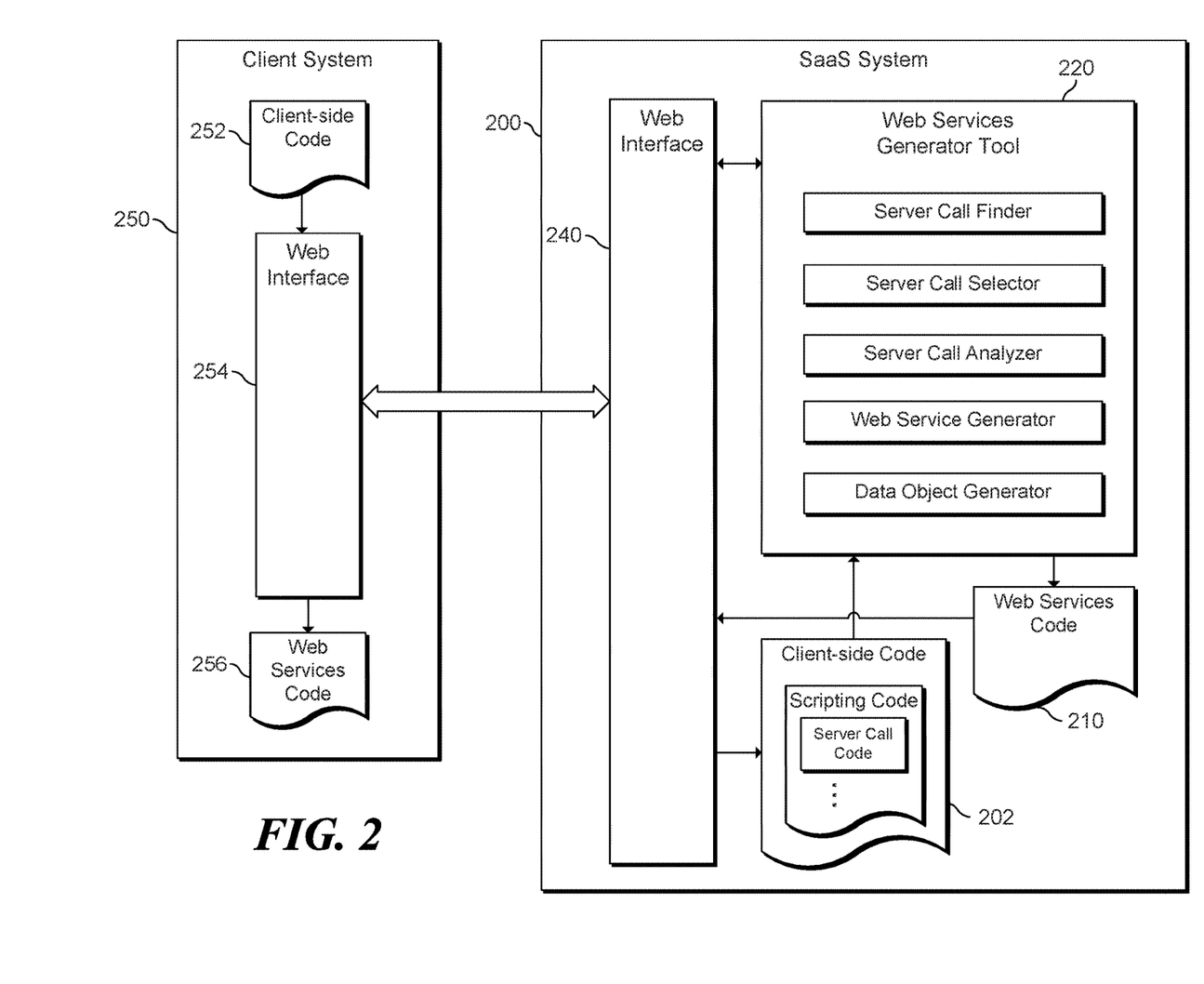
FIG. 2 is a block diagram of an example system in which web services generation based on client-side code may be useful.

FIG. 2 is a block diagram of an example system 200 in which web services generation based on client-side code may be useful. System 200 is similar to system 100 of FIG. 1, where like-named components in system 200 are similar to those in system 100. System 200 is an example of a SaaS (software as a service) system. System 200 may include client-side code 202 which is similar to client-side code 102 of FIG. 1, except client-side code 202 may have been uploaded from a client system (e.g., 250). More specifically, in one example, client system 250 includes client-side code 252, and then client system 250 uploads this client-side code to system 200, which causes a copy of that client-side code (202) to appear on system 200. System 200 may include a web interface 240 to facilitate uploading of client-side code to system 200. Client system 250 may also include a web interface 254 to facilitate such uploading. Web interface 254 of client system 250 may communicate with web interface 240 of system 200.

Once client-side code is uploaded to system 200 (resulting in client-side code 202), web services generator tool 220 accesses this client-side code 202 and operates similarly to web services generator tool 120 of FIG. 1 to generate web services code 210. System 200 may then return web services code 210 to client system 250, via web interface 240 and 254. For example, a user of client system 250 may interact with web interface 254 to download a copy of web services code 210 as web services code 256 on the client system 250. Thus, as described, from the viewpoint of a user of the client system, the user may upload client-side code to system 200 and receive back generated web services code.

Figure 3:
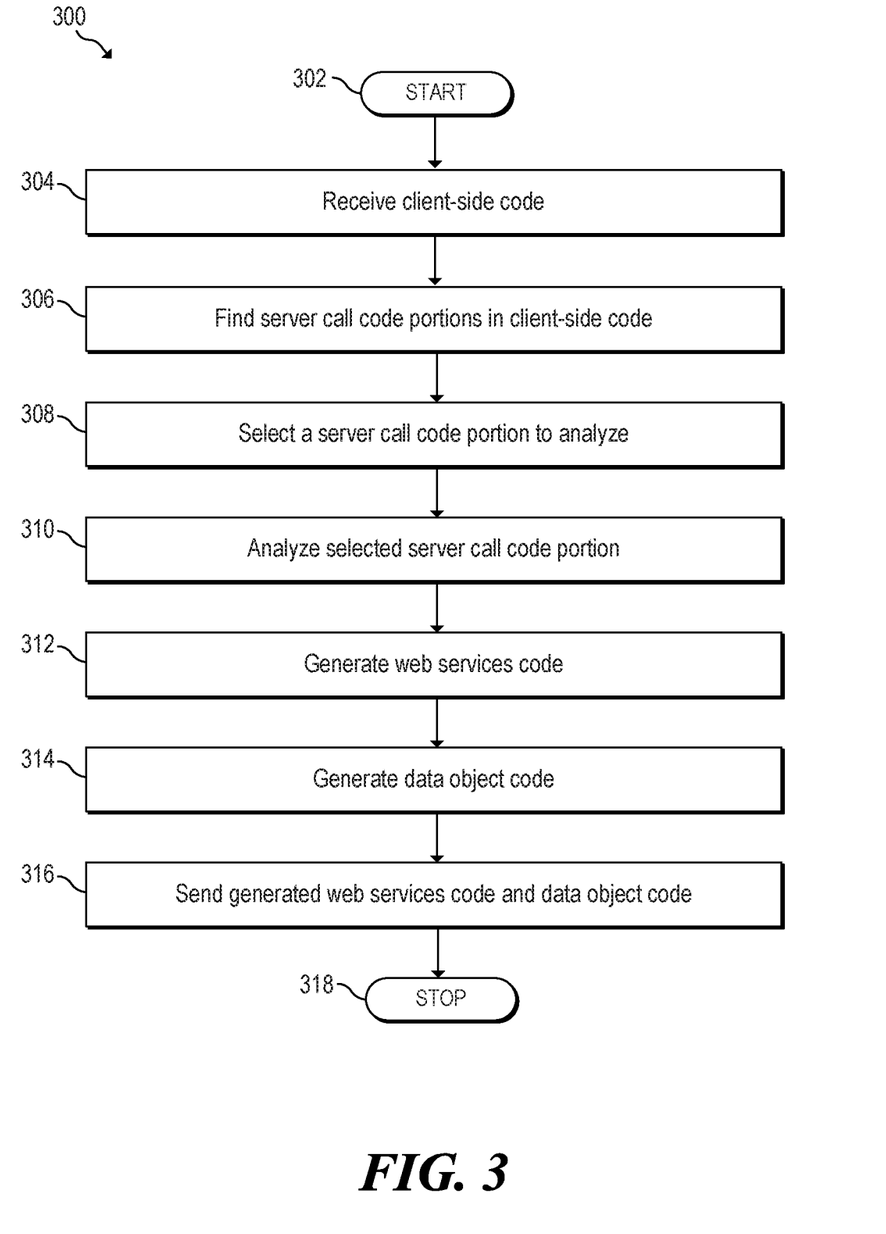
FIG. 3 is a flowchart of an example method for web services generation based on client-side code.

FIG. 3 is a flowchart of an example method 300 for web services generation based on client-side code. Method 300 may be described below as being executed or performed by a system, for example, system 100 of FIG. 1, system 200 of FIG. 2, system 500 of FIG. 5 or system 600 of FIG. 6. Other suitable systems and/or computing devices may be used as well. Method 300 may be implemented in the form of executable instructions stored on at least one machine-readable storage medium of the system and executed by at least one processor of the system. Alternatively or in addition, method 300 may be implemented in the form of electronic circuitry (e.g., hardware). In alternate embodiments of the present disclosure, one or more steps of method 300 may be executed substantially concurrently or in a different order than shown in FIG. 3. In alternate embodiments of the present disclosure, method 300 may include more or less steps than are shown in FIG. 3. In some embodiments, one or more of the steps of method 300 may, at certain times, be ongoing and/or may repeat.

Method 300 may start at step 302 and continue to step 304, where the system may receive client-side code (e.g., 102). In some examples, the client-side code may be uploaded to the system from a client-system, e.g., via a web interface (e.g., 240). At step 306, the system may find (e.g., via server call finder 122) server call code portions in the client-side code, as described in more detail above. At step 308, the system may select (e.g., via server call selector 124) a server call code portion to analyze, as described in more detail above. At step 310, the system may analyze (e.g., via server call analyzer 126) the selected server call code portion, as described in more detail above. At step 312, the system may generate (e.g., via web service generator 128) web services code based on the analysis of the selected server call code portion. At step 314, the system may generate (e.g., via data object generator 130) data object code based on the analysis of the selected call code portion. At step 316, the system may send the generated web services code and data object code (e.g., jointly represented by web services code 110) to some location, for example, to a remote client system (e.g., 250) via a web interface (e.g., 240). Method 300 may eventually continue to step 318, where method 300 may stop.

Figure 4:
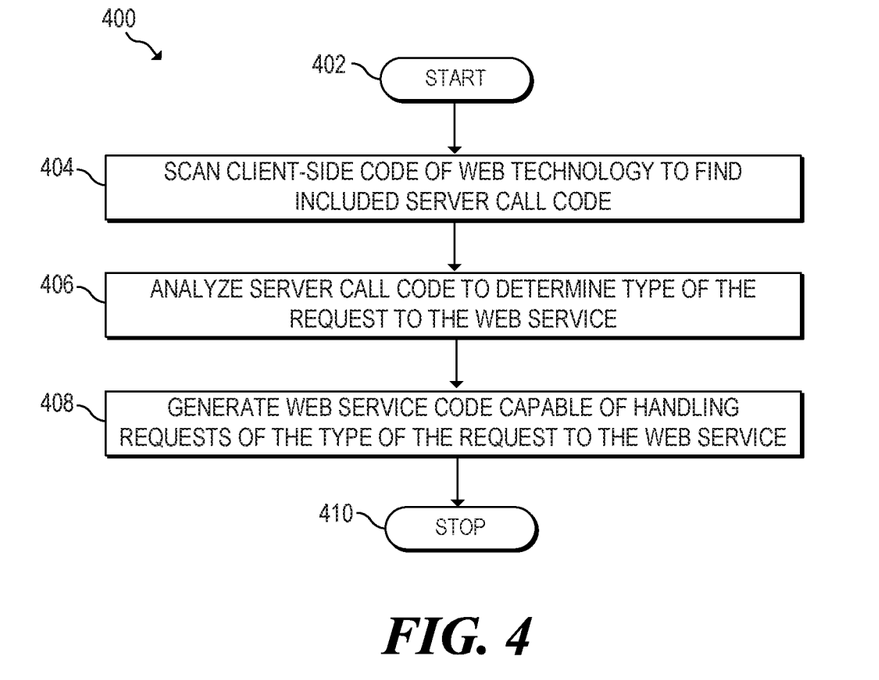
FIG. 4 is a flowchart of an example method for web services generation based on client-side code.

FIG. 4 is a flowchart of an example method 400 for web services generation based on client-side code. Method 400 may be described below as being executed or performed by a system, for example, system 100 of FIG. 1, system 200 of FIG. 2, system 500 of FIG. 5 or system 600 of FIG. 6. Other suitable systems and/or computing devices may be used as well. Method 400 may be implemented in the form of executable instructions stored on at least one machine-readable storage medium of the system and executed by at least one processor of the system. Alternatively or in addition, method 400 may be implemented in the form of electronic circuitry (e.g., hardware). In alternate embodiments of the present disclosure, one or more steps of method 400 may be executed substantially concurrently or in a different order than shown in FIG. 4. In alternate embodiments of the present disclosure, method 400 may include more or less steps than are shown in FIG. 4. In some embodiments, one or more of the steps of method 400 may, at certain times, be ongoing and/or may repeat.

Method 400 may start at step 402 and continue to step 404, where the system may scan client-side code of a web technology to find included server call code, where the server call code includes a request to a web service. The system may analyze the server call code to determine a type of the request to the web service. The system may generate web service code capable of handling requests of the type of the request to the web service. Method 400 may eventually continue to step 410, where method 400 may stop.

Figure 5:
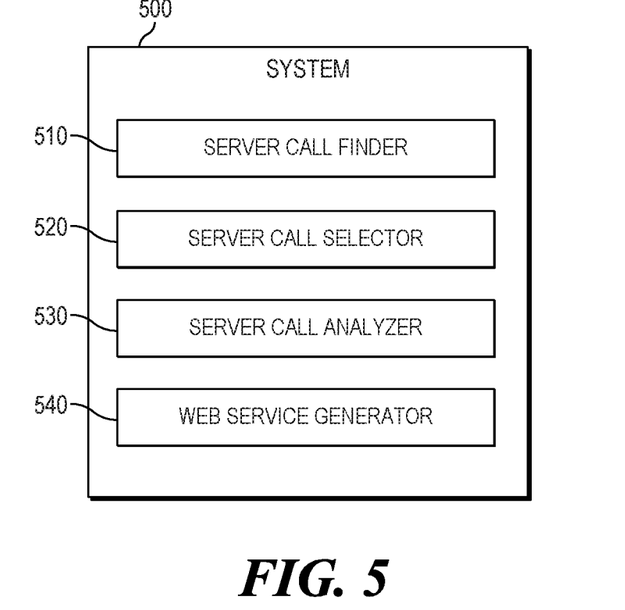
FIG. 5 is a block diagram of an example system for web services generation based on client-side code.

FIG. 5 is a block diagram of an example system 500 for web services generation based on client-side code. System 500 may include at least one computing device that is capable of communicating with at least one remote system. System 500 may be similar to system 100 of FIG. 1 or system 200 of FIG. 2. In the embodiment of FIG. 5, system 500 includes a server call finder 510, a server call selector 520, a server call analyzer 530 and a web service generator 540. Server call finder 510 may be similar to server call finder 122 of FIG. 1, for example. Server call finder 510 may scan client-side code of a web technology to find multiple included server call code portions. Server call finder 510 may be implemented in the form of executable instructions stored on at least one machine-readable storage medium of system 500 and executed by at least one processor of system 500. Alternatively or in addition, server call finder 510 may be implemented in the form of one or more hardware devices including electronic circuitry for implementing the functionality of server call finder 510.

Server call selector 520 may be similar to server call selector 124 of FIG. 1, for example. Server call selector 520 may select a server call code portion from the multiple server call code portions. The selected server call code portion includes a request to a web service. Server call selector 520 may be implemented in the form of executable instructions stored on at least one machine-readable storage medium of system 500 and executed by at least one processor of system 500. Alternatively or in addition, server call selector 520 may be implemented in the form of one or more hardware devices including electronic circuitry for implementing the functionality of server call selector 520.

Server call analyzer 530 may be similar to server call analyzer 126 of FIG. 1, for example. Server call analyzer 530 may analyze the selected server call code portion to determine a type of the request to the web service. Server call analyzer 530 may be implemented in the form of executable instructions stored on at least one machine-readable storage medium of system 500 and executed by at least one processor of system 500. Alternatively or in addition, server call analyzer 530 may be implemented in the form of one or more hardware devices including electronic circuitry for implementing the functionality of server call analyzer 530.

Web service generator 540 may be similar to web service generator 128 of FIG. 1, for example. Web service generator 540 may generate web service code capable of handling requests of the type of the request to the web service. Web service generator 540 may be implemented in the form of executable instructions stored on at least one machine-readable storage medium of system 500 and executed by at least one processor of system 500. Alternatively or in addition, web service generator 540 may be implemented in the form of one or more hardware devices including electronic circuitry for implementing the functionality of web service generator 540.

Figure 6:
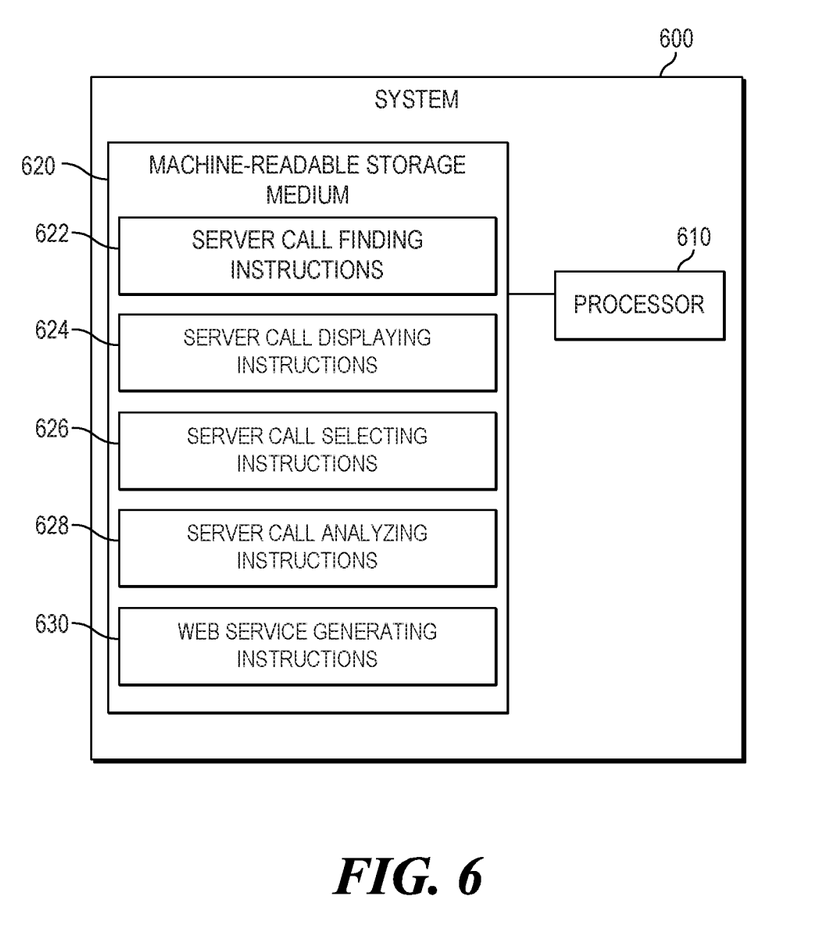
FIG. 6 is a block diagram of an example system for web services generation based on client-side code.

FIG. 6 is a block diagram of an example system 600 for web services generation based on client-side code. System 600 may include at least one computing device that is capable of communicating with at least one remote system. System 600 may be similar to system 100 of FIG. 1 or system 200 of FIG. 2. In the embodiment of FIG. 6, system 600 includes a processor 610 and a machine-readable storage medium 620. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 610 may be one or more central processing units (CPUs), microprocessors, and/or other hardware devices suitable for retrieval and execution of instructions stored in machine-readable storage medium 620. In the particular embodiment shown in FIG. 6, processor 610 may fetch, decode, and execute instructions 622, 624, 626, 628, 630 to perform web services generation based on client-side code. As an alternative or in addition to retrieving and executing instructions, processor 610 may include one or more electronic circuits comprising a number of electronic components for performing the functionality of one or more of the instructions in machine-readable storage medium 620. With respect to the executable instruction representations (e.g., boxes) described and shown herein, it should be understood that part or all of the executable instructions and/or electronic circuits included within one box may, in alternate embodiments, be included in a different box shown in the figures or in a different box not shown.

Machine-readable storage medium 620 may be any electronic, magnetic, optical, or other physical storage device that stores executable instructions. Thus, machine-readable storage medium 620 may be, for example, Random Access Memory (RAM), an Electrically-Erasable Programmable Read-Only Memory (EEPROM), a storage drive, an optical disc, and the like. Machine-readable storage medium 620 may be disposed within system 600, as shown in FIG. 6. In this situation, the executable instructions may be "installed" on the system 600. Alternatively, machine-readable storage medium 620 may be a portable, external or remote storage medium, for example, that allows system 600 to download the instructions from the portable/external/remote storage medium. In this situation, the executable instructions may be part of an "installation package". As described herein, machine-readable storage medium 620 may be encoded with executable instructions for web services generation based on client-side code.

Referring to FIG. 6, server call finding instructions 622, when executed by a processor (e.g., 610), may cause system 600 to scan client-side code of a web technology to find included server call code portions. Each server call code portion includes a request to a web service. Server call displaying instructions 624, when executed by a processor (e.g., 610), may cause system 600 to display all the found server call code portions to a user. Server call selecting instructions 626, when executed by a processor (e.g., 610), may cause system 600 to allow the user to select a particular server call code portion. Server call analyzing instructions 628, when executed by a processor (e.g., 610), may cause system 600 to analyze the selected server call code portion to determine a type of its particular request to a web service. Web service generating instructions 630, when executed by a processor (e.g., 610), may cause system 600 to generate web service code capable of handling requests of the type of the particular request to the web service.

The invention claimed is:

1. A method for web services generation, the method comprising:
    scanning, by a computing device, client-side code of a web technology to find included server call code, wherein the server call code includes a client-side request to a web service;
    analyzing, by the computing device, the server call code to determine a request type of the client-side request and a plurality of data types of parameters provided for the client-side request to the web service; and
    prior to receipt of the client-side request, the computing device generating web service code executable by a server to handle requests of the determined request type of the client-side request and the determined plurality of data types of parameters provided for the client-side request to the web service.

2. The method of claim 1, further comprising:
    generating web service parameters that the web service code receives when handling requests, wherein data types of the web service parameters are determined based on the plurality of data types of the parameters provided for the client-side request to the web service.

3. The method of claim 1, wherein the plurality of data types of the parameters provided for the client-side request to the web service are determined by scanning the client-side code to find code where the parameters are defined, initialized or used.

4. The method of claim 2, wherein the web service parameters are part of a data object and the data object is passed to the web service code.

5. The method of claim 1, further comprising generating a data object that the web service code will respond with when handling requests, wherein the data object includes at least one response variable whose data type is determined by analyzing a response section of the server call code.

6. The method of claim 5, wherein the data type of the at least one response variable is determined based on a context of how a corresponding variable is used in the response section of the server call code.

7. A system for web services generation, the system comprising:
    a processor; and
    a non-transitory storage medium storing instructions, the instructions executable by the processor to:
        scan client-side code of a web technology to find included multiple server call code portions;
        select a server call code portion from the multiple server call code portions, wherein the selected server call code portion includes a client-side request to a web service;
        analyze the selected server call code portion to determine a request type of the client-side request and a plurality of data types of parameters provided for the client-side request to the web service; and
        prior to receipt of the client-side request, generate web service code executable by a server to handle requests of the determined request type of the client-side request and the determined plurality of data types of parameters provided for the client-side request to the web service.

8. The system of claim 7, further comprising a graphical user interface (GUI) that allows a user to perform the selection of the server call code portion from the multiple server call code portions.

9. The system of claim 8, wherein the GUI displays to the user the multiple server call code portions.

10. The system of claim 7, further comprising a web interface to receive the client-side code from a remote system, wherein the web interface is also used to send the generated web service code back to the remote system.

11. The system of claim 7, further comprising instructions to generate at least one response variable to handle response data from the web service, to analyze the selected server call code portion to determine a data format that the server call code portion expects to receive back from the web service, and to use this determination to generate the at least one response variable.

12. A non-transitory machine-readable storage medium encoded with instructions for web services generation, the instructions executable by a processor of a system to cause the system to:
    scan client-side code of a web technology to find included server call code portions;
    display all the found server call code portions to a user;
    allow the user to select a particular server call code portion including a client-side request to a web service;
    analyze the selected server call code portion to determine a request type of the client-side request and a plurality of data types of parameters provided for the client-side request to the web service; and
    prior to receipt of the client-side request, generate web service code executable by a server to handle requests of the determined request type of the client-side request and the determined plurality of data types of parameters provided for the client-side request to the web service.

13. The non-transitory machine-readable storage medium of claim 12, wherein the instructions are executable by a processor of the system to further cause the system to generate a data object that includes web service parameters that are received by the web service code when handling requests.

14. The non-transitory machine-readable storage medium of claim 13, wherein the data types of the web service parameters are determined by scanning the client-side code to find code where corresponding parameters are defined, initialized or used.

15. The non-transitory machine-readable storage medium of claim 12, wherein the web service code establishes the web service at a network address and path, wherein the network address and path are extracted from the selected server call code portion.

16. The non-transitory machine-readable storage medium of claim 12, wherein the system does not include a web service description language (WSDL) file defining an interface between the client-side code and server-side code.

17. The non-transitory machine-readable storage medium of claim 13, wherein the data object is a data transfer object (DTO) that aggregates multiple pieces of data associated with requests to the web service code.

18. The method of claim 1, further comprising:
   generating the web service code without using a web service description language (WSDL) file defining an interface between the client-side code and server-side code.

19. The method of claim 4, wherein the data object is a data transfer object (DTO) that aggregates multiple pieces of data associated with requests to the web service code.

20. The system of claim 7, wherein the system does not include a web service description language (WSDL) file defining an interface between the client-side code and server-side code.

* * * * *